United States Patent
Liu et al.

(10) Patent No.: US 11,541,573 B2
(45) Date of Patent: Jan. 3, 2023

(54) THERMOPLASTIC RESIN PELLET AND METHOD FOR MANUFACTURING ELECTRIC CABLE

(71) Applicant: DAIKIN INDUSTRIES, LTD., Osaka (JP)

(72) Inventors: Jihong Liu, Osaka (JP); Tadahiro Yabu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 117 days.

(21) Appl. No.: 16/645,764

(22) PCT Filed: Sep. 7, 2018

(86) PCT No.: PCT/JP2018/033267
§ 371 (c)(1),
(2) Date: Mar. 9, 2020

(87) PCT Pub. No.: WO2019/054305
PCT Pub. Date: Mar. 21, 2019

(65) Prior Publication Data
US 2020/0282600 A1 Sep. 10, 2020

(30) Foreign Application Priority Data

Sep. 15, 2017 (JP) ............................. JP2017-177637

(51) Int. Cl.
*B29B 9/12* (2006.01)
*B29C 48/154* (2019.01)
(Continued)

(52) U.S. Cl.
CPC ................ *B29B 9/12* (2013.01); *B29B 7/826* (2013.01); *B29C 48/154* (2019.02);
(Continued)

(58) Field of Classification Search
CPC ..... B29C 48/154; B29C 48/288; H01B 3/445; C08F 214/18–287; C08L 27/12–20
See application file for complete search history.

(56) References Cited

U.S. PATENT DOCUMENTS 3,148,412 A * 9/1964 Spreeuwers .......... B29C 48/288
264/211
4,181,647 A 1/1980 Beach
(Continued)

FOREIGN PATENT DOCUMENTS

CN 1462233 A 12/2003
EP 3 088 462 A1 11/2016
(Continued)

OTHER PUBLICATIONS

Drobny, Handbook of Thermoplastic Elastomers, 2nd Edition, 2014, pp. 49 and 50 (Year: 2014).*
(Continued)

*Primary Examiner* — Jeffrey M Wollschlager
(74) *Attorney, Agent, or Firm* — Global IP Counselors, LLP

(57) ABSTRACT

A thermoplastic resin pellet is columnar. A cross-sectional shape taken along a plane orthogonal to a height direction of the thermoplastic resin pellet has a longer diameter represented by "a" and a shorter diameter represented by "b". A ratio a/b is greater than or equal to 1.0, and the ratio a/b is less than or equal to 2.6. A ratio α of a unit height volume of a cylindrical portion of a hopper of a molding machine, into which the thermoplastic resin pellet is loaded, to a volume of the thermoplastic resin pellet is greater than 16. A method for manufacturing an electric cable includes supplying the thermoplastic resin pellet to the hopper, melting the thermoplastic resin pellet in the cylinder to supply (Continued)

molten resin to the die, and extruding the molten resin from the die to form a sheath on a core wire.

13 Claims, 9 Drawing Sheets

(51) Int. Cl.
  *B29C 48/285* (2019.01)
  *B29B 7/82* (2006.01)
  *H01B 13/14* (2006.01)

(52) U.S. Cl.
  CPC ....... *B29C 48/2883* (2019.02); *H01B 13/147* (2013.01); *H01B 13/148* (2013.01); *B29B 2009/125* (2013.01)

(56) References Cited

U.S. PATENT DOCUMENTS

| | | | |
|---|---|---|---|
| 8,617,706 | B2 | 12/2013 | Komiya et al. |
| 2003/0165658 | A1 | 9/2003 | Hayakawa et al. |
| 2005/0236731 | A1 | 10/2005 | Hayakawa et al. |
| 2008/0284057 | A1 | 11/2008 | Hayakawa et al. |
| 2014/0080933 | A1* | 3/2014 | Abe ............... C08J 9/102 521/79 |
| 2016/0303768 | A1 | 10/2016 | Usui |
| 2017/0008986 | A1 | 1/2017 | Isaka et al. |
| 2020/0262952 | A1* | 8/2020 | Sakakibara ........... B29B 9/16 |

FOREIGN PATENT DOCUMENTS

| | | |
|---|---|---|
| EP | 3 378 617 A1 | 9/2018 |
| GB | 1 604 338 | 12/1981 |
| JP | 2003-170494 A | 6/2003 |
| JP | 2003-170497 A | 6/2003 |
| JP | 2003-266432 A | 9/2003 |
| WO | 2017/126499 A1 | 7/2017 |

OTHER PUBLICATIONS

International Search Report of corresponding PCT Application No. PCT/JP2018/033237 dated Nov. 20, 2018.
European Search Report of corresponding EP Application No. 18 85 5971.0 dated May 3, 2021.
International Preliminary Report of corresponding PCT Application No. PCT/JP2018/033267 dated Mar. 17, 2020.

* cited by examiner

THERMOPLASTIC RESIN PELLET AND METHOD FOR MANUFACTURING ELECTRIC CABLE

CROSS-REFERENCE TO RELATED APPLICATIONS

This U.S. National stage application claims priority under 35 U.S.C. § 119(a) to Japanese Patent Application No. 2017-177637, filed in Japan on Sep. 15, 2017, the entire contents of which are hereby incorporated herein by reference.

BACKGROUND

Field of the Invention

The present invention relates to a thermoplastic resin pellet and a method for manufacturing an electric cable.

Background Information

Thermoplastic resin is widely used in the form of pellets as raw material for various types of molded products such as fibers, films, and sheets. To facilitate handling of the thermoplastic resin pellets such as when transporting the thermoplastic resin pellets for storage or when supplying the thermoplastic resin pellets to a molding machine, the thermoplastic resin pellets need to have an appropriate bulk density and to spread properly when put into a silo or the like. For example, the thermoplastic resin pellets in Japanese Laid-Open Patent Publication No, 2003-266432 have an increased bulk density and an appropriate shape so that the thermoplastic resin pellets smoothly spread when put into a silo or the like.

SUMMARY

When manufacturing products with a large amount of thermoplastic resin pellets using a molding machine such as an injection molding machine or an extrusion molding machine, it is preferred that the thermoplastic resin pellets smoothly flow from a hopper of the molding machine to a cylinder from the viewpoint of moldability. However, Japanese Laid-Open Patent Publication No. 2003-266432 only mentions the form of the thermoplastic resin pellets and does not consider the flowability of the thermoplastic resin pellets from the hopper of the molding machine to the cylinder.

The objective of the present disclosure is to provide a thermoplastic resin pellet and a method for manufacturing an electric cable that limit decreases in the flowability of the thermoplastic resin pellets from a hopper of a molding machine to a cylinder.

A thermoplastic resin pellet in accordance with one aspect is columnar. When a cross-sectional shape taken along a plane orthogonal to a height direction of the thermoplastic resin pellet has a longer diameter represented by "a" and a shorter diameter represented by "b", a ratio a/b of the long diameter "a" to the short diameter "b" is greater than or equal to 1.0 and less than or equal to 2.6. A ratio α of a unit height volume of a cylindrical portion of a hopper of a molding machine, into which the thermoplastic resin pellet is loaded, to a volume of the thermoplastic resin pellet is greater than 16.

This structure limits decreases in the flowability of the thermoplastic resin pellets flowing out of the hopper of the molding machine to the cylinder thereby stabilizing the of a product.

Here, the ratio of the unit height volume of the cylindrical portion of the hopper to the volume of a single (grain of) thermoplastic resin pellet is obtained to define the flowability of the thermoplastic resin pellets in the cylindrical portion of the hopper. The unit height volume is obtained by calculating a product of an area of an outlet of the cylindrical portion of the hopper and a unit height of the cylindrical portion of the hopper. Here, the physical unit of the unit height coincides with the physical unit of a height of the thermoplastic resin pellet and the physical unit of a diameter of the outlet of the hopper. Specifically, when the physical unit of the height of the thermoplastic resin pellet and the physical unit of the diameter of the outlet of the hopper is "mm", the physical unit of the unit height is "mm". Further, when the physical unit of the unit height is "mm", the unit height is 1 mm.

In the thermoplastic resin pellet, it is preferred that when a height of the thermoplastic resin pellet is "t", the thermoplastic resin pellet further satisfies equation (1).

$$0.6 \le \sqrt{ab}/t \le 2.5 \qquad (1)$$

This structure further limits decreases in the flowability of the thermoplastic resin pellets flowing out of the hopper of the molding machine to the cylinder.

In the thermoplastic resin pellet, it is preferred that the ratio a/b is greater than 1.0 and less than or equal to 1.8.

This structure further limits decreases in the flowability of the thermoplastic resin pellets flowing out of the hopper of the molding machine to the cylinder.

In the thermoplastic resin pellet, it is preferred that the ratio a/b is greater than or equal to 1.3 and less than or equal to 1.7.

This structure even further limits decreases in the flowability of the thermoplastic resin pellets flowing out of the hopper of the molding machine to the cylinder.

In the thermoplastic resin pellet, it is preferred that the ratio a/b is greater than or equal to 1.4 and less than or equal to 1.6.

This structure even further limits decreases in the flowability of the thermoplastic resin pellets flowing out of the hopper of the molding machine to the cylinder.

In the thermoplastic resin pellet, it is preferred that the cross-sectional shape is elliptic.

This structure does not have a straight portion in a rim as viewed from the height direction of the thermoplastic resin pellet, thereby even further limiting decreases in the flowability of the thermoplastic resin pellets flowing out of the hopper of the molding machine to the cylinder. Also, this increases the production efficiency of the thermoplastic resin pellets compared to when producing a thermoplastic resin pellet of which the cross-sectional shape is a circle.

A method for manufacturing an electric cable in accordance with another aspect is performed using a molding machine (10) to manufacture an electric cable (20) that includes a core wire (21) and a sheath (22) surrounding the core wire. The molding machine (10) includes a cylinder, a screw, a die, and a hopper. The screw is accommodated in the cylinder. The die is coupled to a distal end of the cylinder. The hopper supplies the thermoplastic resin pellet to the cylinder. The method includes supplying the thermoplastic resin pellet to the hopper. The method further includes melting the thermoplastic resin pellet in the cylinder to supply a molten resin to the die. The method further includes extruding the molten resin from the die to form the sheath on the core wire.

This structure limits decreases in the flowability of the thermoplastic resin pellets flowing out of the hopper to the cylinder, thereby reducing unevenness in a thickness of the sheath.

DETAILED DESCRIPTION OF EMBODIMENT(S)

A thermoplastic resin pellet (hereafter, simply referred to as "pellet 1") will now be described with reference to the drawings.

Figure 1A:
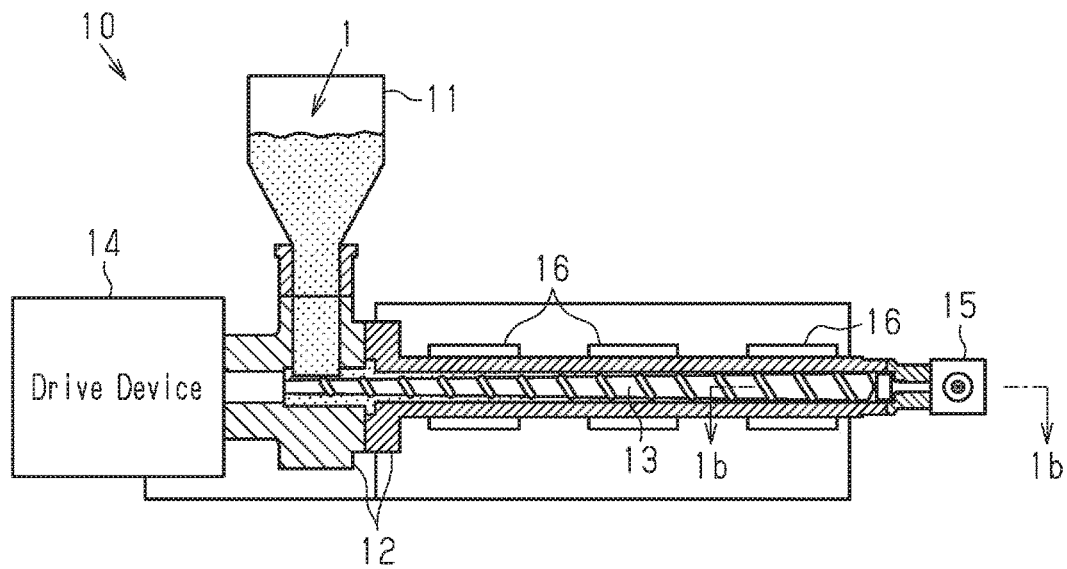
FIG. 1A is a cross-sectional view of an extrusion molding machine, into which a thermoplastic resin pellet of the present embodiment has been loaded.
Figure 1B:
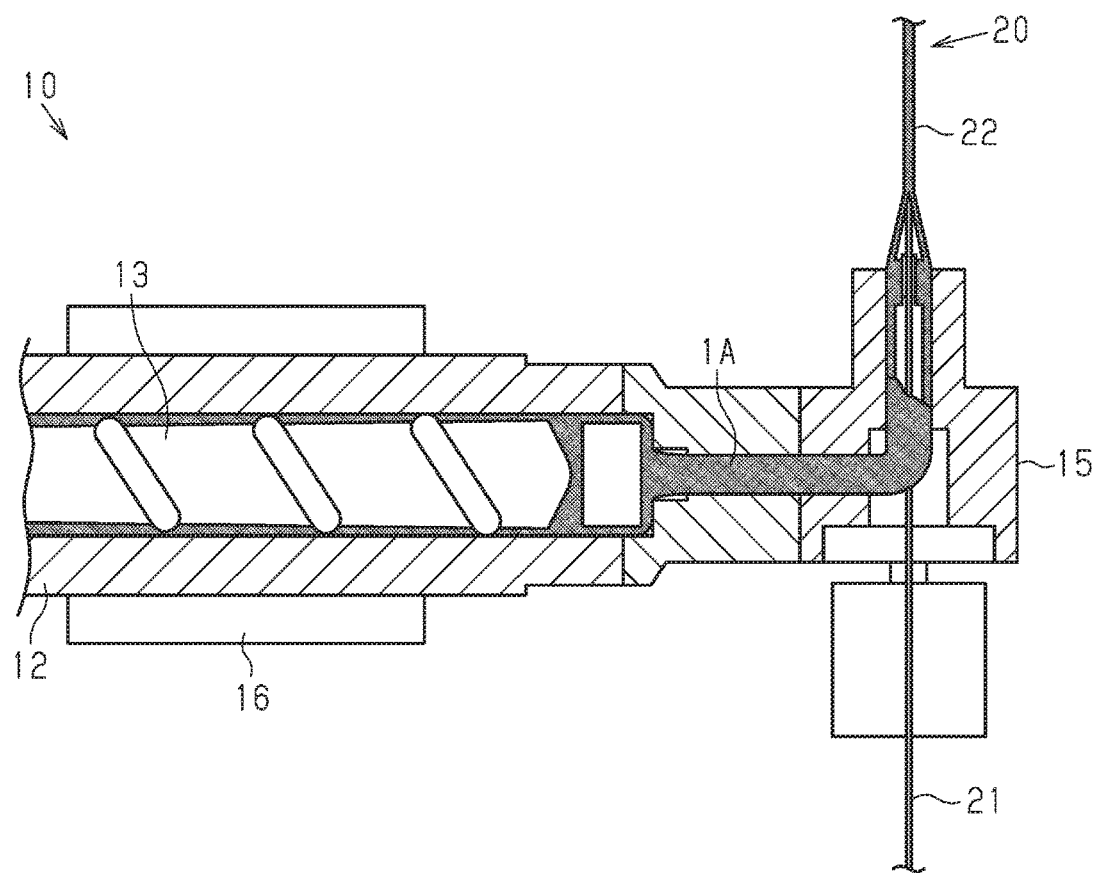
FIG. 1B is a cross-sectional view taken along line 1b-1b in FIG. 1A showing a die of the extrusion molding machine, into which the thermoplastic resin pellet of the present embodiment has been loaded.

A large amount of pellets 1 are loaded into, for example, an extrusion molding machine 10 shown in FIG. 1A. The extrusion molding machine 10 is a manufacturing apparatus for an electric cable 20. As shown in FIG. 1B, the electric cable 20 includes a core wire 21 and a sheath 22 that surrounds the core wire 21. The extrusion molding machine 10 forms the sheath 22 with the large amount of the pellets 1. The electric wire 20 can be used as a cable, for example, an electric cable product having a small diameter and a thin wall such as a LAN cable that connects a computer and its peripheral devices. Preferably, in an electric cable product having a small diameter and a thin wall, the core wire 21 has a diameter of 0.02 mm or greater and 3 mm or less and the sheath 22 has a thickness of 0.1 mm or greater and 3 mm or less. The diameter of the core wire 21 is preferably 0.04 min or greater, further preferably, 0.05 mm or greater, and particularly preferably, 0.1 mm or greater. Preferably, the diameter of the core wire 21 is 2 mm or less. Preferably, the thickness of the sheath 22 is 2 mm or less.

As shown in FIG. 1A, the extrusion molding machine 10 includes a hopper 11, a cylinder 12, a screw 13, a drive device 14, a die 15, and a heater 16. The hopper 11, the screw 13, the die 15, and the heater 16 are coupled to the cylinder 12. A large amount of the pellets 1 are loaded into the hopper 11. The screw 13 is inserted into the cylinder 12 and connected to the drive device 14. The drive device 14 is coupled to a basal end of the cylinder 12 and includes a motor (not shown), which serves as a drive source, and a decelerator (not shown), which is connected to the motor. The screw 13 is connected to an output unit of the decelerator. The heater 16 is coupled to an outer circumferential portion of the cylinder 12 to heat the cylinder 12. The die 15 is coupled to a distal end of the cylinder 12. As shown in FIG. 1B, the core wire 21 is inserted through the die 15. The die 15 is connected to the inside of the cylinder 12.

A method for manufacturing the electric wire 20 using the extrusion molding machine 10 includes a step of supplying a large amount of the pellets 1 to the hopper 11, a step of melting the pellets 1 inside the cylinder 12 to supply molten resin 1A to the die 15, and a step of extruding the molten resin 1A from the die 15 to form the sheath 22 on the core wire 21. More specifically, as shown in FIG. 1A, a large amount of the pellets 1 are loaded into the hopper 11. The pellets 1 in the hopper 11 move into the cylinder 12 because of the weight of the pellets 1. Here, the heater 16 heats the cylinder 12 so that the pellets 1 inside the cylinder 12 are melted into the molten resin 1A. Then, when the drive device 14 rotates the screw 13, the molten resin 1A is extruded toward the die 15. Subsequently, as shown in FIG. 1B, the molten resin 1A extruded from the die 15 attaches to the core wire 21. This coats the core wire 21 with the molten resin 1A and forms the sheath 22.

The sheath 22 may include bubbles. When the sheath 22 includes bubbles, it is preferred that the bubbles are evenly distributed in the sheath 22. The average bubble diameter of the bubbles is not limited. For example, the average bubble diameter of the bubbles is preferably 60 μm or less, more preferably, 45 μm or less, further preferably, 35 μm or less, even further preferably, 30 μm or less, particularly preferably, 25 μm or less, and especially preferably, 23 μm or less. Moreover, the average bubble diameter is preferably 0.1 μm or greater, and further preferably, 1 μm or greater. The average bubble diameter can be obtained by capturing an electronic microscope image of a cross section of the electric wire 20, calculating the diameter of each bubble through an image processing, and averaging the diameters.

The sheath 22 may have a foaming rate of 20% or greater. The foaming rate is further preferably 30% or greater, more preferably, 33% or greater, and even further preferably, 35% or greater. An upper limit of the foaming rate is not limited and may be, for example, 80%. The upper limit of the foaming rate may be 60%. The foaming rate is calculated from ((relative density of thermoplastic resin used as sheath−relative density of sheath)/relative density of thermoplastic resin used as sheath)×100. The foaming rate can be adjusted in accordance with application, for example, by adjusting the amount of inserted gas in the extrusion molding machine or selecting the type of gas used for melting.

The material of the pellet 1 may be of various types. Examples of the material for the pellet 1 include a fluororesin (ETFE, PFA), polyethylene (PE), high-density polyethylene (HDPE), medium-density polyethylene (MDPE), low-density polyethylene (LDPE), polypropylene (PP), polyvinyl chloride (PVC), polyvinylidene chloride (PVDC), polystyrene (PS), polyvinyl acetate (PCAc), polyurethane (PUR), acrylonitrile butadiene styrene resin (ABS resin), acrylonitrile styrene resin (AS resin), acrylic resin (PMMA), polyamide (PA), nylon, polyacetal (POM), polycarbonate (PC), modified polyphenylene ether (m-PPE, modified-PPE), polyphenylene oxide (PPO), polyethylene terephthalate (PET), glass fiber-reinforced polyethylene terephthalate (GF-PET), polybutylene terephthalate (PBT), cyclic polyolefin (COP), polyphenylene sulfide (PPS), polysulfone (PSF), polyethersulfone (PES), amorphous polyacrylate (PAR), liquid crystal polymer (LCP), polyether ether ketone (PEEK), thermoplastic polyimide (PI), and polyamide-imide (PAT).

The material for the pellet 1 of the present embodiment is a fluororesin. The fluororesin may include an end group such as $—CF_3$ and $—CF_2H$ in at least one of a polymer main-chain or a polymer side-chain. Preferably, although not limited, the fluororesin is fluorinated. A non-fluorinated fluororesin may include an end group having thermally and electrically unstable characteristics such as —COOH, $—COOH_3$, $—CH_2OH$, —COF, and $—CONH_2$, (hereafter, such end group will be referred to as "unstable end group"). A fluorination treatment reduces the unstable end group. Thus, when the fluororesin is fluorinated, the pellets 1 have a higher flowability.

Preferably, the fluororesin includes a small amount of or no unstable end groups, and the number of the unstable end groups is 120 or less per $1×10^6$ of carbons. Also, it is further preferred that a total number of the five unstable end groups and $—CF_2H$ end group, namely, —COOH, $—COOH_3—$, $—CH_2OH$, —COF, $—CONH_2$, and $—CF_2H$, included in the fluororesin is 120 or less per $1×10^6$ of carbons. When the total number is 120 or less, the fluororesin has an extremely superior flowability. Further, when the total number exceeds 120, molding defects may occur in the pellets. Preferably, the number of the unstable end groups is 50 or less, further preferably, 20 or less, and the most preferably, 10 or less. In the present specification, the number of the unstable end groups is a value obtained from an infrared absorption spectrum measurement. The fluororesin does not have to include any unstable end groups or $—CF_2H$ end groups, and the end groups may all be $—CF_3$ end groups.

The fluorination treatment can be performed by having a non-fluorinated fluororesin contact with a fluorine-containing compound. Although not limited, the fluorine-containing compound is, for example, a fluorine radical source that generates a fluorine radical under a fluorination treatment condition. Examples of the fluorine radical source may be $F_2$ gas, $CoF_3$, $AgF_2$, $UF_6$, $OF_2$, $N_2F_2$, $CF_3OF$, and halogen fluoride (e.g., $IF_5$, $ClF_3$). The fluorine radical source such as $F_2$ gas may be of 100% concentration. However, from the viewpoint of safety, it is preferred that the fluorine radical source is mixed with an inert gas and diluted to 5 to 50 mass %, further preferably, diluted to 15 to 30 mass %. Examples of the inert gas include nitrogen gas, helium gas, and argon gas. Preferably, the inert gas is nitrogen gas.

The fluorination treatment condition is not limited, and a molten fluororesin may contact the fluorine-containing compound. Typically, the fluorination treatment is performed under a temperature that is lower than or equal to a melting point of the fluororesin, preferably, under a temperature of 20° C. to 220° C., and further preferably, under a temperature of 100° C. to 200° C. The fluorination treatment is typically performed for 1 to 30 hours, and preferably 5 to 25 hours. Preferably, the fluorination treatment is performed by having a non-fluorinated fluororesin contact a fluorine gas ($F_2$ gas).

Preferably, the fluororesin has a melt flow rate (MFR) of 0.1 to 100 g/10 min. Further preferably, the melt flow rate is 20 to 100 g/10 min, even further preferably, 20 to 60 g/10 min, and particularly preferably, 35 to 45 g/10 min. The MFR is a value measured in accordance with ASTM D-1238 or JIS K 7210 using a die, of which the diameter is 2.1 mm and the length is 8 mm, under a load of 5 kg at 372° C.

The melting point of the fluororesin is preferably 140° C. to 320° C., further preferably, 160° C. or higher, and even further preferably, 200° C. or higher. The melting point is a temperature that corresponds to a maximum peak value on a heat of fusion curve obtained by increasing the temperature at a speed of 10° C./min with a differential scanning calorimeter (DSC).

Further, the fluororesin is preferably a melt-processible fluororesin. Preferably, the fluororesin is perfluoro resin. Examples of the fluororesin include tetrafluoroethylene (TFE)/hexafluoropropylene (HFP) copolymer, TFE/perfluoro (alkyl vinyl ether) (PAVE) copolymer, polychlorotrifluoroethylene (PCTFE), TFE/CTFE/PAVE copolymer, and the like. Examples of PAVE include perfluoro (methyl vinyl ether) [PMVE], perfluoro (ethyl vinyl ether) [PEVE], perfluoro (propyl vinyl ether) [PPVE], and the like. Specifically, PPVE is preferred among these. A single type or a combination of two or more types of the above can be used.

Further, the fluororesin may have a polymerization unit based on another monomer in an amount that does not impair essential properties of each fluororesin. The other monomer can be selected from, for example, TFE, HFP, perfluoro (alkyl vinyl ether), perfluoro (alkyl aryl ether), and the like. Preferably, the perfluoro alkyl group forming the other monomer has 1 to 10 carbon atoms.

Moreover, the fluororesin is preferably at least one type selected from a group consisting of TFE/HFP copolymer and TFE/PAVE copolymer for its superior heat resistance. Further preferably, the fluororesin is TFE/HFP copolymer. Two or more types of the fluororesin may be used together. Furthermore, the fluororesin is also preferably a perfluoro resin for its superior electric characteristics. It is particularly preferred that the fluororesin is a copolymer having TFE unit of 80 to 93 mass % and HFP unit of 7 to 20 mass %, or a copolymer having TFE unit of 75 to 92 mass %, HFP unit of 7 to 20 mass %, and PAVE unit of 0.1 to 5 mass %.

The fluororesin can be synthesized by polymerizing a monomer component using a typical polymerization method such as emulsion polymerization, suspension polymerization, solution polymerization, mass polymerization, and gas phase polymerization. In polymerization reaction in the above polymerization method, a chain transfer agent such as methanol may be used. The fluororesin may be manufactured through polymerization and isolation without using a reagent, which includes a metal ion.

Further, it is preferred that the fluororesin includes less than 50 ppm of an alkali metal. Further preferably, the fluororesin includes less than approximately 25 ppm of an alkali metal, even further preferably, less than approximately 10 ppm, and the most preferably, less than approximately 5 ppm. When the fluororesin is obtained through polymerization and isolation without including an alkali metal, the content of alkali metal will be in the above range.

The content of alkali metal was measured by an ashing method. In the ashing method, the contents for elements other than potassium element were measured under the following condition. First, 2 g of potassium sulfate aqueous solution having 0.2 mass % and approximately 2 g of methanol were added to 2 g of a sample and heated at 580° C. for 30 minutes to burn the resin. Next, the obtained residue was washed twice with 20 ml of 0.1 N hydrochloric acid (10 ml×2 times). Then, the 0.1 N hydrochloric acid used for the washing was measured for the content other than potassium element with an atomic absorption measurement device (HITACHI Z-8100 Polarized Zeeman Atomic Absorption Spectrophotometer). In the ashing method, the content of potassium was measured under the above-described condition except that the potassium sulfate aqueous solution having 0.2 mass % was changed to sodium sulfate aqueous solution having 0.2 mass %.

The pellet 1 may include a known additive such as a filler and a stabilizer. Examples of the filler include graphite, carbon fiber, coke, silica, zinc oxide, magnesium oxide, tin oxide, antimony oxide, calcium carbonate, magnesium carbonate, glass, talc, mica, isinglass, aluminum nitride, calcium phosphate, sericite, diatomite, silicon nitride, fine silica, alumina, zirconia, quartz powder, kaolin, bentonite, and titanium oxide. The shape of the filler is not limited and may be in a form of fibers, needles, powder, grains, beads, and the like.

The pellet 1 may include boron nitride, polyatomic anion-containing mineral salt, sulfonic acid, sulfonate, and the like. The pellet 1 including the above can be used in a preferred manner when the sheath 22 of the electric wire 20 includes bubbles (refer FIG. 1B). The sulfonic acid and sulfonate may be, for example, $F(CF_2)_nCH_2CH_2SO_3M$, $F(CF_2)_nSO_3M$ (in expression, "n" is integer between 2 to 12, M represents H, $NH_4$, or alkaline earth metal), and the like. The polyatomic anion-containing mineral salt may be that disclosed in U.S. Pat. No. 4,764,538, preferably, calcium tetraborate. Further, the pellet 1 may include a filler such as glass fiber, glass powder, and asbestos fiber, a reinforcer, a stabilizer, a lubricant, a pigment, and other additives.

The pellet 1 can be manufactured by a method including a step of melt-molding a fluororesin, which is obtained by a known polymerization method. The molding process may include melt-extruding a fluororesin, for example, with a single screw extruder, a double screw extruder, or a tandem extruder and then cutting the fluororesin into pellets having a predetermined length. The appropriate temperature for the melt extrusion varies depending on a melt viscosity of the fluororesin or the manufacturing method. Preferably, the extrusion temperature is 20° C. to 140° C. higher than the melting point of the fluororesin. The cutting method of the fluororesin of the present embodiment is a strand cutting method.

The manufacturing method of the pellet 1 may further include a step of fluorination treatment of the fluororesin. The fluorination treatment may be performed by contacting, for example, a pellet, which is obtained by the above-described process of the melt molding, to a fluorine-containing compound. Alternatively, the fluorination treatment may be performed by contacting a fluororesin and a fluorine-containing compound before the melt molding. Further, the fluorination treatment may be performed by contacting a fluororesin and a fluorine-containing compound multiple times before and after the melt molding. Accordingly, the fluororesin contacted to a fluorine-containing compound may have any shape such as powders, flakes, or pellets. However, the melt molding may generate the above-described unstable end groups. Thus, the fluorination treatment is preferably performed by contacting a pellet, which is obtained by the melt molding, to a fluorine-containing compound considering the production efficiency and flowability.

Figure 2A:
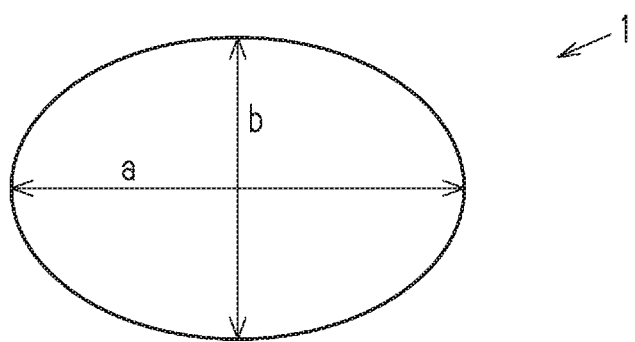
FIG. 2A is a cross-sectional view of the thermoplastic resin pellet taken along a plane orthogonal to a height direction.
Figure 2B:
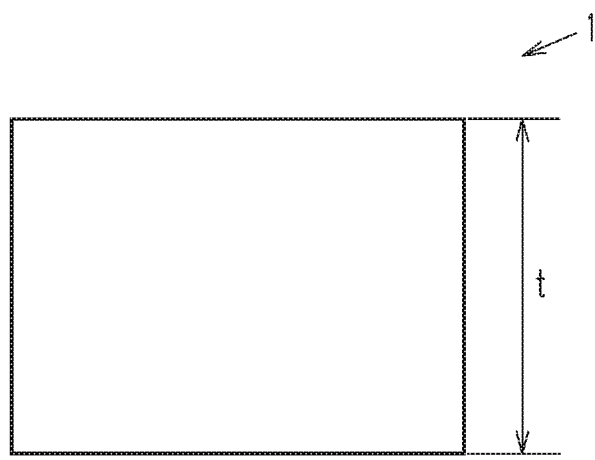
FIG. 2B is a side view of the thermoplastic resin et.

As described above, the pellet 1 is cut by the strand cutting method. Thus, the pellet 1 is columnar as shown in FIGS. 2A and 2B. Preferably, the shape of the pellet 1 does not include any corners. Preferably, the cross-sectional shape taken along a plane orthogonal to the height direction of the pellet 1 is a smooth shape having an outer envelope curve with no corners. The cross-sectional shape taken along a plane orthogonal to the height direction of the pellet 1 of the present embodiment is substantially elliptic.

In the cross-sectional shape of the pellet 1 shown in FIG. 2A, a longer diameter will be referred to as "longer diameter a" and a shorter diameter will be referred to as "shorter diameter b". As shown in FIG. 2B, a height of the pellet 1 is defined as "height t". In this case, the cross-sectional shape of the pellet 1 is such that a ratio a/b of the longer diameter a to the shorter diameter b is greater than or equal to 1.0 and less than or equal to 2.6. When the ratio a/b is 1.0, the cross-sectional shape of the pellet 1 is a circle. As the ratio a/b increases, the cross-sectional shape of the pellet 1 becomes an elongated ellipse.

Preferably, the ratio a/b is greater than 1.0 and less than or equal to 1.8, further preferably, greater than or equal to 1.3 and less than or equal to 1.7, particularly preferably, less than or equal to 1.4 and less than or equal to 1.6, and the most preferably, equal to 1.6. When the ratio a/b is 1.0, the longer diameter a and the shorter diameter b are equal in length. In the present disclosure, the terms, "longer diameter" and "shorter diameter" will be used even when their lengths are equal to facilitate understanding.

Further, the cross-sectional shape of the pellet 1 satisfies the following equation (1).

$$0.6 \leq \sqrt{ab}/t \leq 2.5 \qquad (1)$$

Here, "$\sqrt{ab}$" indicates a representative length of the cross-sectional shape of the pellet 1, and "$\sqrt{ab}/t$" indicates a ratio of the representative length of the cross-sectional shape of the pellet 1 to the height t of the pellet 1. As this value increases, the columnar cross-sectional shape becomes flatter.

The pellet 1 can have a characteristic shape by adjusting the feeding speed of a raw material into an extruder that manufactures the pellet 1, the rotation speed of a screw, the number of holes in a die, the diameter of the holes, the rotation speed of a cutter, and the like. The longer diameter a and the shorter diameter b of the pellet 1 can be adjusted by changing the hole diameter as long as the feeding speed of the raw material and the number of holes in the die are the same. The height t of the pellet 1 can be adjusted by changing the rotational speed of the cutter as long as the feeding speed of the raw material and the number of holes in the die are the same.

Figure 3:
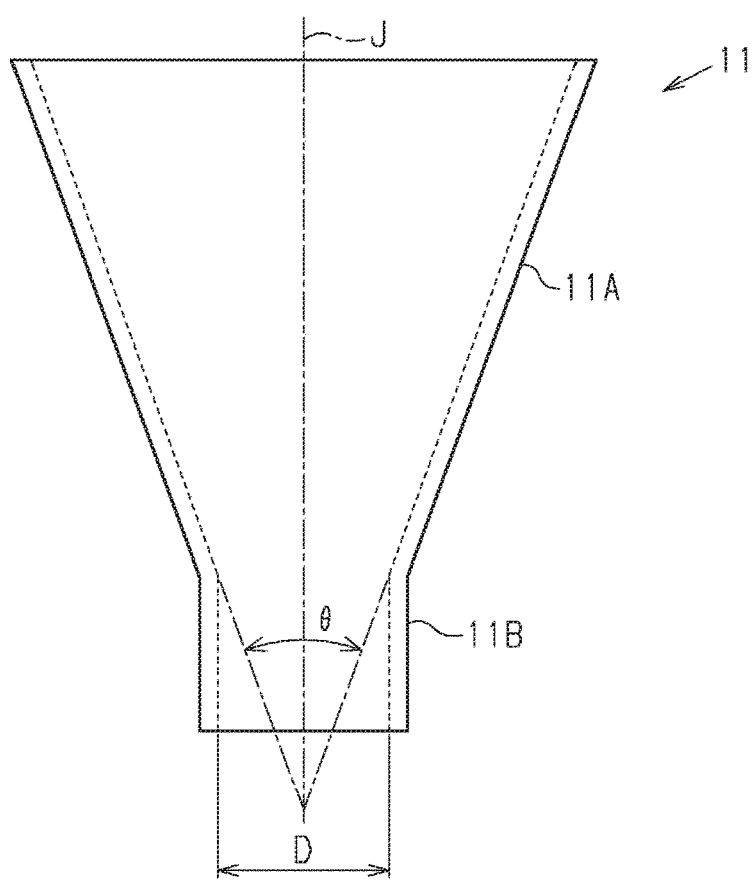
FIG. 3 is a side view of a hopper of the extrusion molding machine.

FIG. 3 shows part of the hopper 11 shown in FIG. 1A. The hopper 11 includes a loading port 11A, which has the shape of a truncated cone, and a cylindrical portion 11B. A large amount of the pellets 1 are loaded into the input portion 11A. The cylindrical portion 11B includes an outlet out of which the pellets 1 flow to the cylinder 12. The input portion 11A has a diameter that is decreased toward the cylindrical portion 11B. Preferably, angle θ, which is formed by a circumferential wall of the input portion 11A, is greater than or equal to 40° and less than or equal to 600 in a cross section extending along a center axis J of the hopper 11. In the present embodiment, the angle θ of the hopper 11 is 40°. Preferably, the cylindrical portion 11B has an inner diameter D that is smaller than an outer diameter of the screw 13. In one example, the inner diameter D is less than or equal to 20 mm. With the pellet 1 manufactured by the strand cutting method, the inner diameter D is preferably greater than or equal to 11.7 mm. This limits decreases in the flowability of the pellets 1. Examples of the inner diameter D of the cylindrical portion 11B are 11.7 mm, 12.7 mm, 13.2 mm, and 13.6 mm.

With the cylindrical portion 11B of the hopper 11 and the pellet 1, a ratio α of a unit height volume of the cylindrical portion 11B to the volume of a single (grain of) pellet 1 is greater than 16 (α>16). Here, the ratio of the unit height volume of the cylindrical portion 11B to the volume of a single (grain of) pellet 1 is obtained to define the flowability of the pellets 1 in the cylindrical portion 11B. The unit height volume is obtained by calculating a product of an area of the outlet of the cylindrical portion 11B ($\pi \times (D/2)^2$) and the unit height of the cylindrical portion 11B. The physical unit of the unit height coincides with the physical unit of the height t of the pellet 1 or the physical unit of the diameter of the outlet (inner diameter D of cylindrical portion 11B). Specifically, when the physical unit of the height t of the pellet 1 or the physical unit of the diameter of the outlet (inner diameter D of cylindrical portion 11B) is "mm", the physical unit of the unit height is "mm". Further, when the physical unit of the unit height is "mm", the unit height is 1 mm.

The relationship between the cross-sectional shape of the pellet 1, the pellet 1, and the cylindrical portion 11B of the hopper 11 is set by simulations to decrease the flowability of the pellets 1 when flowing from the hopper 11 to the cylinder 12. Finite element analysis (FEM) is conducted to perform the simulations so that the pellet 1 is modeled with a solid element and the hopper 11 is modeled with a shell element.

In the simulations, time (hereafter, "discharge time") is calculated from a state in which 10 g of the pellets 1 are loaded into the hopper 11 until all the pellets 1 flow out of the cylindrical portion 11B because of the weight of the pellets 1. The discharge time is correlated with the flowability of the pellets 1. The flowability of the pellets 1 increases as the discharge time becomes shorter. Further, in the simulation, the angle θ of the hopper 11 was 40°, and the inner diameter D of the cylindrical portion 11B was 11.7 mm, 12.7 mm, 13.2 mm, or 13.6 mm.

The simulations include a first simulation to a fifth simulation. In the first simulation, with the pellets 1 of the same volume, the ratio a/b of the longer diameter a to the shorter diameter b of the pellet 1 was varied and then the discharge time was calculated. In the first simulation, the volume of a single (grain of) pellet 1 was calculated using the longer diameter a of 2.3 mm, the shorter diameter b of 2.3 mm, and the height t of 1.7 mm. In the second simulation, the height t of the pellet 1 was varied and then the discharge time was calculated. In the third simulation, the outer diameter of the pellet 1 was varied and then the discharge time was calculated. In the fourth simulation, the longer diameter a (shorter diameter b) was varied while the ratio of the longer diameter a (shorter diameter b) to the height t was maintained, and then the discharge time was calculated. In the fifth simulation, with the pellets 1 having the same volume and a cross-sectional shape that is a circle, the ratio of the longer diameter a (shorter diameter b) and the height t was varied and then the discharge time was calculated. Further, in the first simulation, the angle θ of the hopper 11 was set to 40°, and the inner diameter D of the cylindrical portion 11B was set to 13.2 mm. In the second to fourth simulations, the angle θ of the hopper 11 was set to 40°, and the inner diameter D of the cylindrical portion 11B was set to 11.7 mm. In the fifth simulation, the angle θ of the hopper 11 was set to 40°, and the inner diameter D of the cylindrical portion 11B was changed to three types of the inner diameters D, namely 11.7 mm, 12.7 mm, and 13.6 mm.

First Simulation

Figure 4:
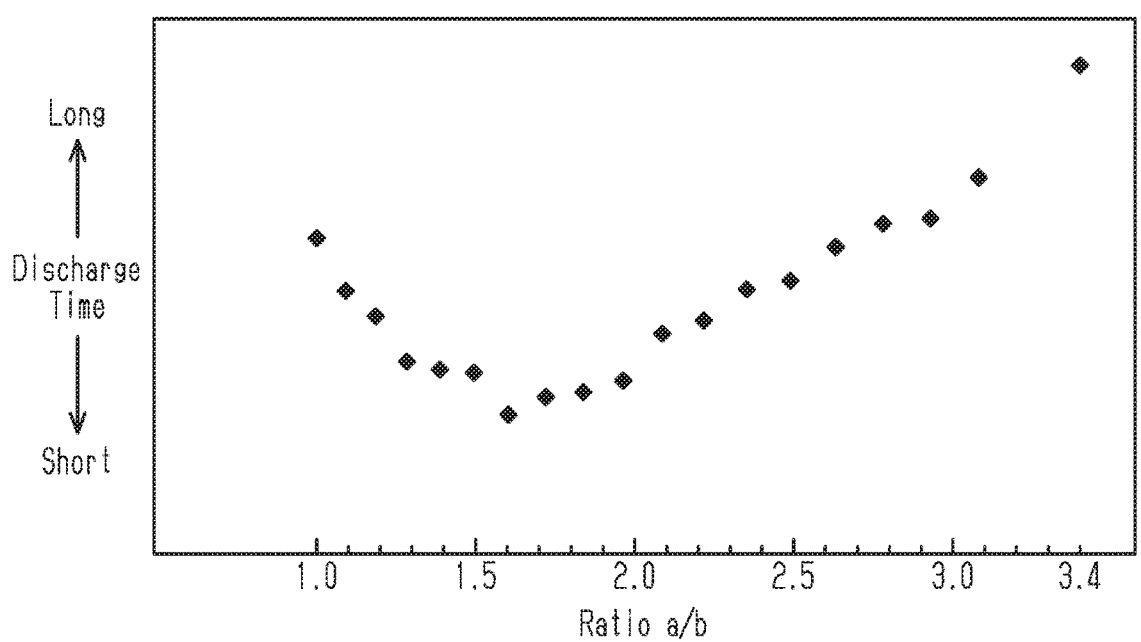
FIG. 4 is a graph illustrating the relationship between a ratio of a longer diameter to a shorter diameter of the thermoplastic resin pellet and a discharge time.

In the first simulation, when the ratio a/b was 1.0, the cross-sectional shape of the pellet 1 was a circle, and when the ratio a/b was greater than 1.0, the cross-sectional shape of the pellet 1 was elliptic. FIG. 4 shows the simulation results when the ratio a/b was varied in a range of 1.0 to approximately 3.4. Using a minimum value of the longer diameter a of 2.3 mm and the height t of 1.7 mm, the shorter diameter b was calculated based on the volume of a single (grain of) pellet 1, the longer diameter a, and the height t (1.7 mm). Then, the value of the ratio a/b was obtained. The ratio a/b was varied by increasing the longer diameter a by 0.2 mm.

As shown in FIG. 4, when the ratio a/b is greater than 2.6, the discharge time is longer than when the ratio a/b is 1.0. That is, when the ratio a/b is greater than 2.6, the flowability of the pellets 1 decreases. Thus, when the ratio a/b is greater than or equal to 1.0 and less than or equal to 2.6, decreases in the flowability of the pellets 1 is limited. Further, in a range in which the ratio a/b is greater than or equal to 1.0 and less than or equal to 1.6, the discharge time becomes shorter as the ratio a/b increases. When the ratio a/b is greater than 1.6, the discharge time becomes longer as the ratio a/b increases. Thus, when the ratio a/b is greater than 1.0 and greater than or equal to 1.8, the discharge time becomes shorter. Further, when the ratio a/b is greater than or equal to 1.3 and less than or equal to 1.7, the discharge time becomes even shorter. When the ratio a/b is greater than or equal to 1.4 and less than or equal to 1.6, the discharge time is particularly short. When the ratio a/b is 1.6, the discharge time is the shortest.

Second Simulation

Figure 5:
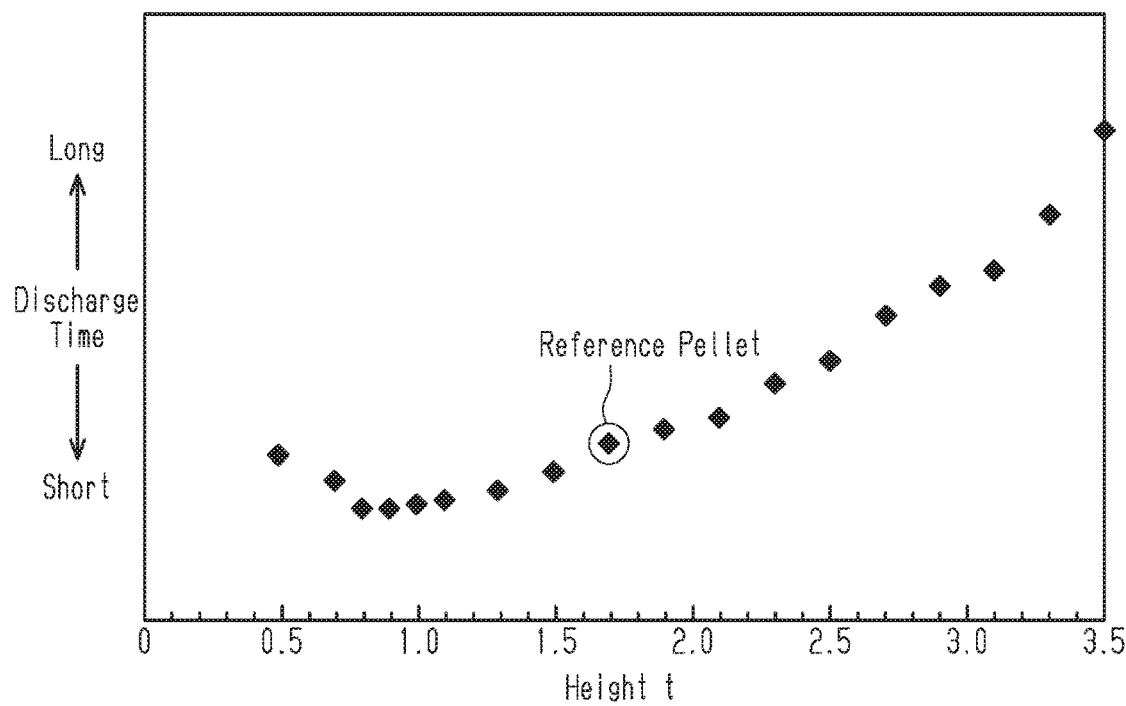
FIG. 5 is a graph illustrating the relationship of a height of the thermoplastic resin pellet and the discharge time.
Figure 6:
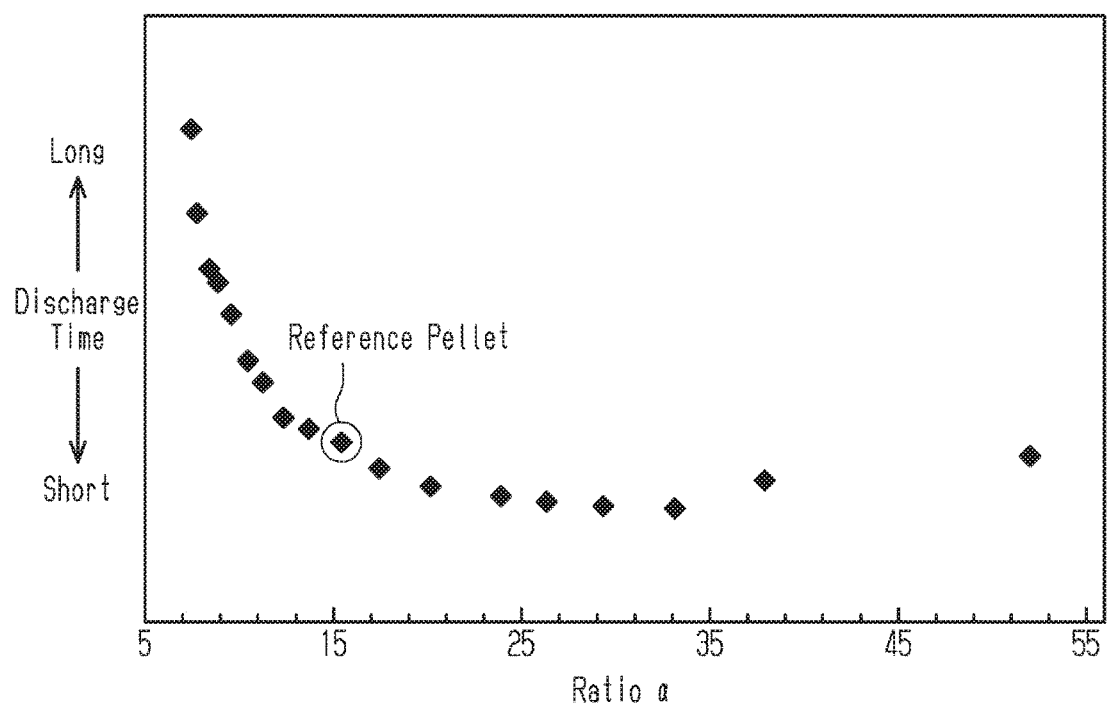
FIG. 6 is a graph illustrating the relationship between a ratio of a unit height volume of a cylindrical portion of the hopper of the extrusion molding machine to a volume of a single (grain of) thermoplastic resin pellet and the discharge time.

A pellet 1 with the longer diameter a of 2.3 mm, the shorter diameter b of 2.3 mm, and the height t of 1.7 mm was defined as a reference pellet. In the second simulation, only the height t was varied from the reference pellet and then the discharge time was calculated. FIG. 5 shows the simulation results when the height t was varied in a range of 0.5 to 3.5 mm. FIG. 6 shows the simulation results illustrating the relationship between the ratio α of the unit height volume of the cylindrical portion II B to the volume of a single (grain of) pellet 1 and the discharge time when the height t was varied in a range of 0.5 to 3.5 mm.

As shown in FIG. 5, when the height t of the pellet 1 is greater than the height t of the reference pellet (1.7 mm), the discharge time becomes longer as the height t of the pellet 1 increases. When the height t of the pellet 1 is less than the height t of the reference pellet (1.7 mm), the discharge time of the pellet 1 is shorter than that of the reference pellet. Thus, the pellets 1 with the height t of 0.7 mm or greater and 1.5 mm or less have a higher flowability than the reference pellet. Further, when the height t is 0.8 mm, the discharge time of the pellet 1 is the shortest. When the height t is less than 0.8 mm, the discharge time of the pellet 1 gradually becomes longer as the height t decreases. As shown in FIG. 5, when the height t of 0.7 mm or greater and 1.5 mm, the discharge time of the pellet 1 is short.

As shown in FIG. 6, the discharge time becomes shorter as the ratio α of the unit height volume of the cylindrical portion II B to the volume of a single (grain of) pellet 1 increases. When the ratio α is approximately 33, the discharge time is the shortest. In a range in which the ratio α is greater than approximately 33, the discharge time gradually becomes longer as the ratio α increases. When the ratio α is approximately 52, the discharge time is the same as or slightly shorter than that of the reference pellet (ratio α=15). As shown in FIG. 6, when the ratio α is greater than 16 (α>16), the discharge time of the pellet 1 is short.

Third Simulation

Figure 7:
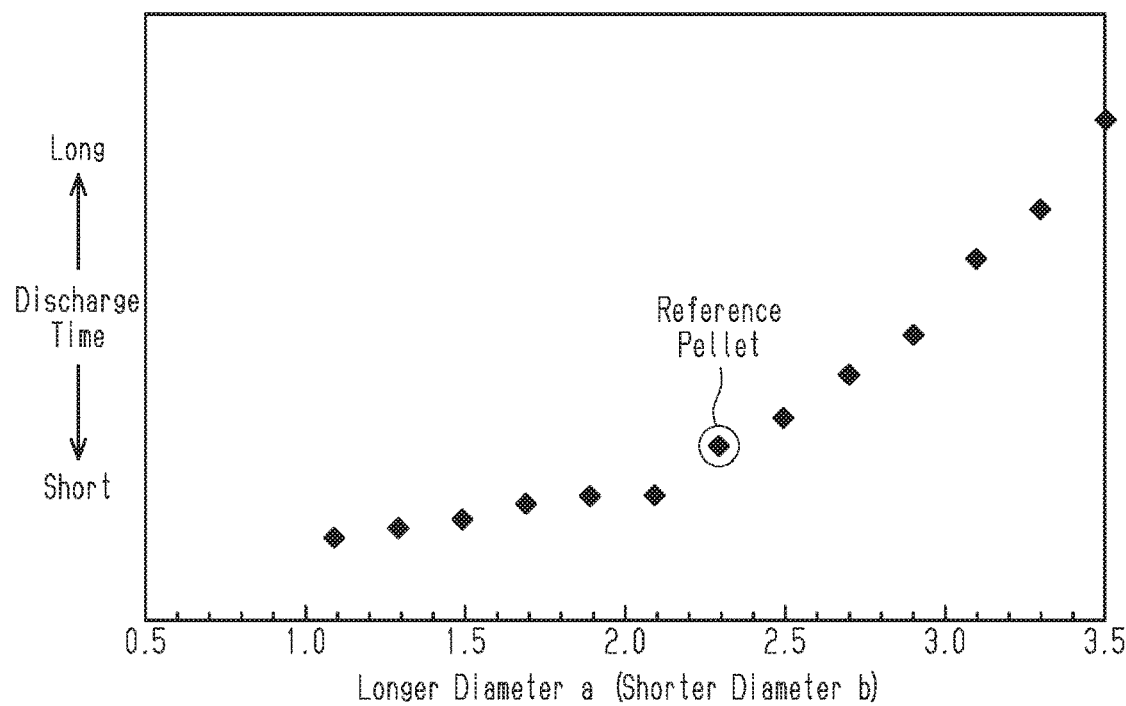
FIG. 7 is a graph illustrating the relationship between the longer diameter (shorter diameter) of the thermoplastic resin pellet and the discharge time.
Figure 8:
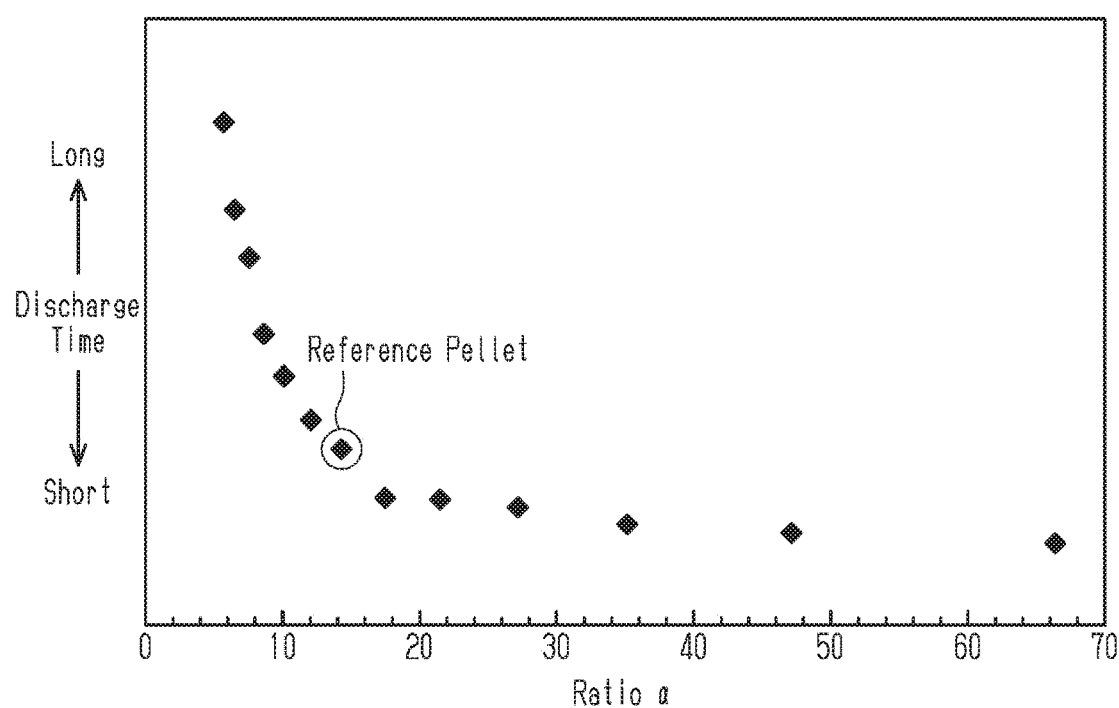
FIG. 8 is a graph illustrating the relationship between the ratio of the unit height volume of the cylindrical portion of the hopper of the extrusion molding machine to the volume of a single (grain of) thermoplastic resin pellet and the discharge time.

A pellet 1 with the longer diameter a of 2.3 mm, the shorter diameter b of 2.3 mm, and the height t of 1.7 mm was defined as a reference pellet. In the third simulation, only the longer diameter a and the shorter diameter b were varied from the reference pellet and then the discharge time was calculated. In the third simulation, the cross-sectional shape of the pellet 1 was a circle. Specifically, in the third simulation, the longer diameter a and the shorter diameter b were varied while being kept equal to each other so that the cross-sectional shape of the pellet 1 was a circle. FIG. 7 shows the simulation results when the longer diameter a and the shorter diameter b were varied in a range of 1.1 to 3.5 mm. FIG. 8 shows the simulation results illustrating the relationship between the ratio α of the unit height volume of the cylindrical portion 11B to the volume of a single (grain of) pellet 1 and the discharge time when the longer diameter a and the shorter diameter b were varied in a range of 1.1 to 3.5 mm.

As shown in FIG. 7, the discharge time becomes shorter as the longer diameter a and the shorter diameter b decrease. In a range in which the longer diameter a and the shorter diameter b of the pellet 1 are greater than the longer diameter a and the shorter diameter b of the reference pellet, the discharge time rapidly becomes longer as the longer diameter a and the shorter diameter b of the pellet 1 increase. In a range in which the longer diameter a and the shorter diameter b of the pellet 1 are less than the longer diameter a and the shorter diameter b of the reference pellet, the discharge time gradually becomes shorter as the longer diameter a and the shorter diameter b of the pellet 1 decrease. As shown in FIG. 7, when the longer diameter a and the shorter diameter b of the pellet 1 are 1.1 mm or greater and 2.3 mm or less, the discharge time of the pellet 1 is short.

As shown in FIG. 8, the discharge time becomes shorter as the ratio α of the unit height volume of the cylindrical portion II B to the volume of a single (grain of) pellet 1 increases. In a range in which the ratio α is greater than that of the reference pellet (ratio α=15), when the ratio α is greater than 16 (α>16), the discharge time of the pellet 1 is particularly short.

Fourth Simulation

Figure 9:
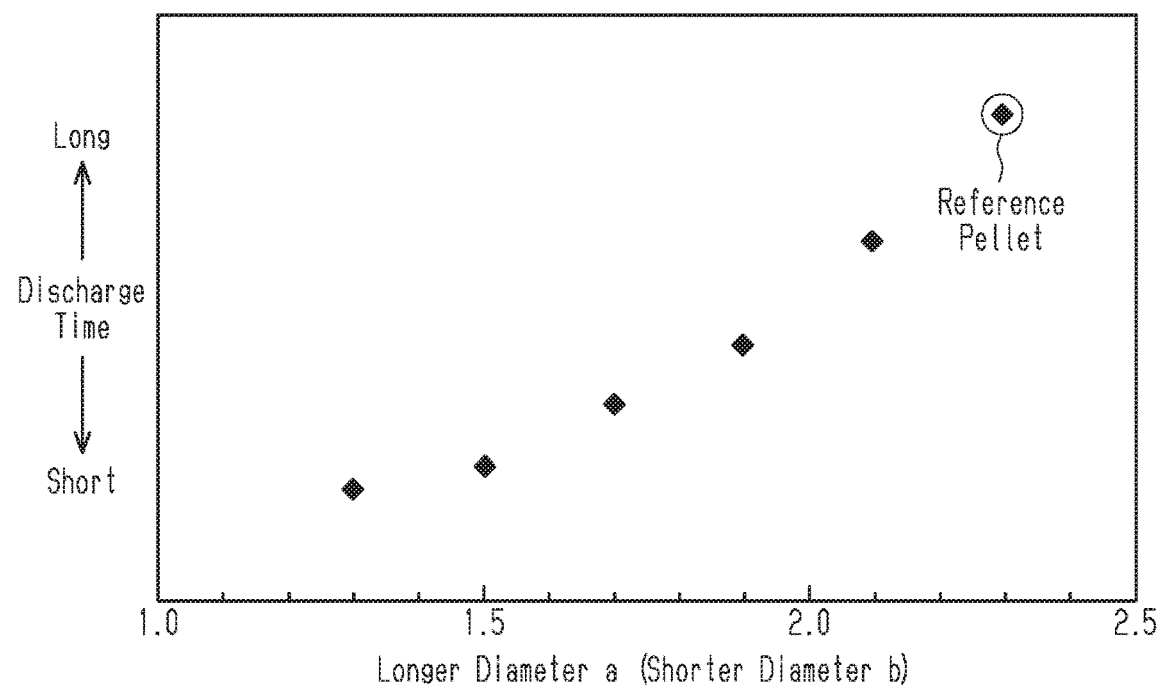
FIG. 9 is a graph illustrating the relationship between the longer diameter (shorter diameter) and the discharge time in a state in which a ratio of the longer diameter (shorter diameter) to the height of the thermoplastic resin pellet is constant.
Figure 10:
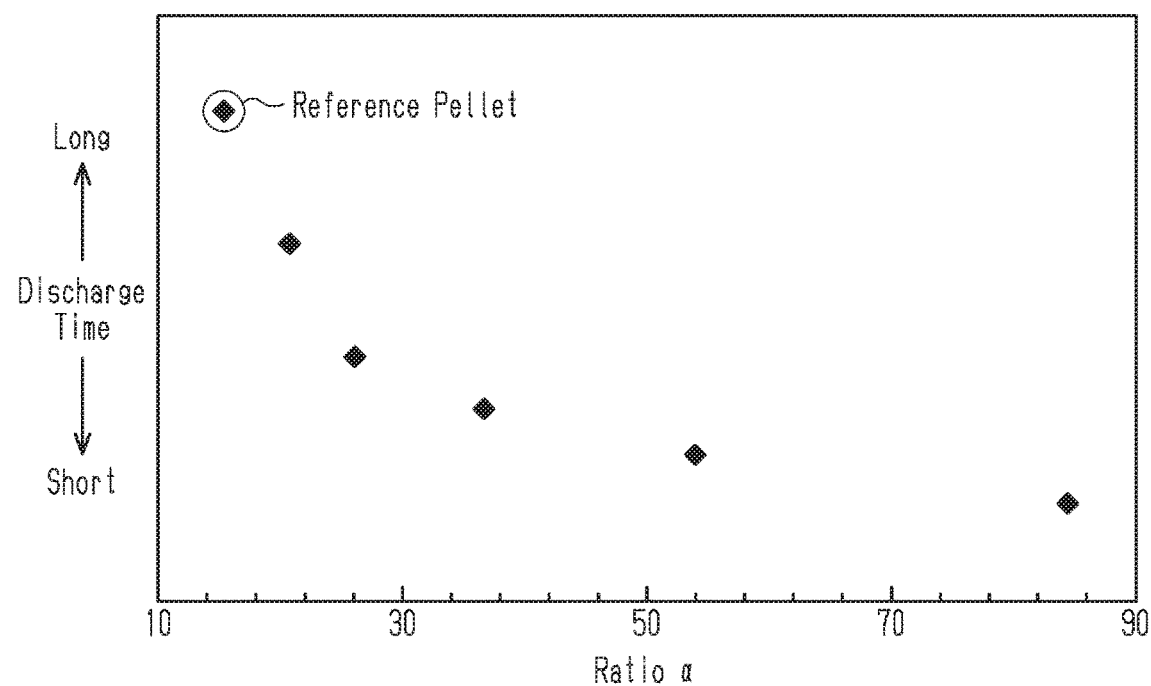
FIG. 10 is a graph illustrating the relationship between the ratio of the unit height volume of the cylindrical portion of the hopper of the extrusion molding machine to the volume of a single (grain of) thermoplastic resin pellet and the discharge time.

The pellet 1 with the longer diameter a of 2.3 mm, the shorter diameter b of 2.3 mm, and the height t of 1.7 mm was defined as a reference pellet. In the fourth simulation, the longer diameter a and the shorter diameter b were varied while the ratio (2.3/1.7) of the longer diameter a (shorter diameter b) of the reference pellet to the height t of the reference pellet was maintained and then the discharge time was calculated. In the fourth simulation, the cross-sectional shape of the pellet 1 was a circle. Specifically, in the fourth simulation, the longer diameter a and the shorter diameter b were varied while being kept equal to each other so that the cross-sectional shape of the pellet 1 was a circle. FIG. 9 shows the simulation results when the longer diameter a and the shorter diameter b were varied by 0.2 mm in a range of 1.3 to 2.3 mm. FIG. 10 shows the simulation results illustrating the relationship between the ratio α of the unit height volume of the cylindrical portion 11B to the volume of a single (grain of) pellet 1 and the discharge time when the longer diameter a and the shorter diameter b were varied by 0.2 mm in a range of 1.3 to 2.3 mm. In the fourth simulation, the height t of the pellet 1 was varied in accordance with the change in the longer diameter a and the shorter diameter b so that the ratio of the longer diameter a (shorter diameter b) to the height t maintained at 2.3/1.7.

As shown in FIG. 9, the discharge time becomes shorter as the longer diameter a and the shorter diameter b decrease. A change ratio of decreases in the discharge time to decreases in the longer diameter a and the shorter diameter b in a range, in which the longer diameter a and the shorter diameter b of the pellet 1 is 2.0 mm or less, is smaller than a change ratio of decreases in the discharge time relative to decreases in the longer diameter a and the shorter diameter b in a range, in which the longer diameter a and the shorter diameter b of the pellet 1 are greater than 2.0 mm.

As shown in FIG. 10, the discharge time becomes shorter as the ratio α of the unit height volume of the cylindrical portion 11B to the volume of a single (grain of) pellet 1 increases. In a range in which the ratio α is greater than that of the reference pellet (ratio α=15), when the ratio α is greater than 16 (α>16), the discharge time of the pellet 1 is particularly short.

Fifth Simulation

Figure 11:
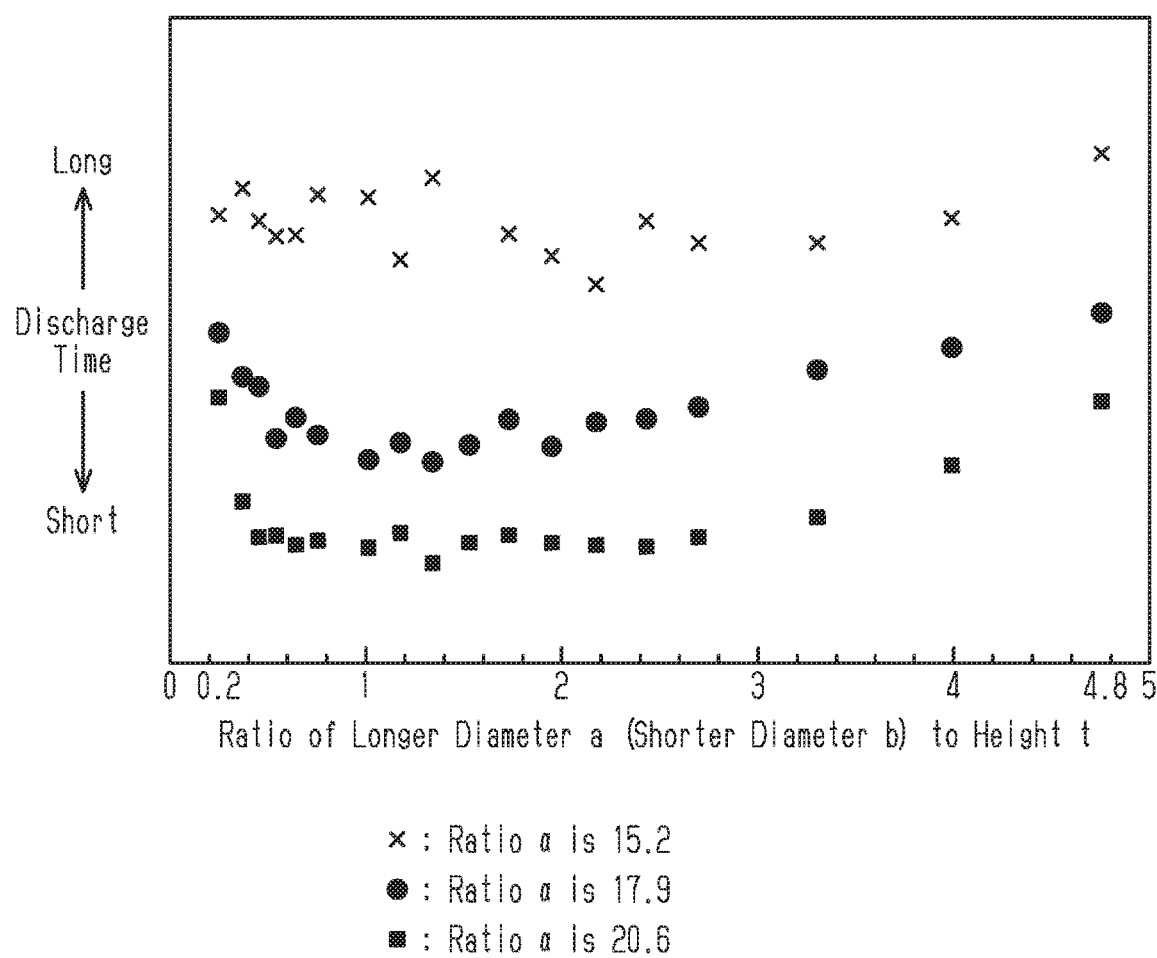
FIG. 11 is a graph illustrating the relationship between the ratio of the longer diameter (shorter diameter) to the height of the thermoplastic resin pellet and the discharge time.

In the fifth simulation, the inner diameter D of the cylindrical portion 11B of the hopper 11 and the ratio of the longer diameter a (shorter diameter b) to the height t were varied and then the discharge time was calculated. FIG. 11 shows results of the simulation in which the inner diameter D of the cylindrical portion 11B of the hopper 11 was varied to three types, namely 11.7 mm, 12.7 mm, and 13.6 mm and the ratio of the longer diameter a (shorter diameter b) to the height t was varied in a range of 0.2 to 4.8. When the inner diameter D was 11.7 mm, the ratio α of the unit height volume of the cylindrical portion 11B to the volume of a single (grain of) pellet 1 was approximately 15.2. When the inner diameter D was 12.7 mm, the ratio α was approximately 17.9. When the inner diameter D was 13.6 mm, the ratio α was approximately 20.6. The graph indicated by "x" in FIG. 11 illustrates the simulation result when the ratio α was approximately 15.2 (inner diameter D is 11.7 mm), the graph indicated by black dots illustrates the simulation result when the ratio α was approximately 17.9 (inner diameter D is 12.7 mm), and the graph indicated by squares illustrates the simulation result when the ratio α was approximately 20.6 (inner diameter D is 13.6 mm). Further, in the fifth simulation, the cross-sectional shape of the pellet 1 was a circle.

As shown in FIG. 11, in a case where the ratio α was approximately 15.2, the discharge time is more dispersed as the ratio of the longer diameter a (shorter diameter b) to the height t varies than when the ratio α was approximately 17.9 and the ratio α was approximately 20.6. Thus, the flow of the pellets 1 from the cylindrical portion 11B to the cylinder 12 becomes unstable when manufacturing errors in the pellets 1 cause a dispersion in the ratio of the longer diameter a (shorter diameter b) to the height t of the pellet 1. In other words, the manufacturing errors in the pellets 1 result in a greater dispersion of the flowability of the pellets 1. Further, when the ratio α was approximately 20.6, the discharge time is less dispersed as the ratio of the longer diameter a (shorter diameter b) to the height t varies than when the ratio α was approximately 17.9. Thus, it can be determined that the discharge time is less dispersed when the ratio of the longer diameter a (shorter diameter b) to the height t varies as the ratio α increases.

Moreover, in the simulation results when the ratio α was approximately 17.9 and approximately 20.6, the discharge time becomes longer as the ratio of the longer diameter a (shorter diameter b) to the height t increases in a range where the ratio of the longer diameter a (shorter diameter b) to the height t is greater than 2.6. In contrast, in the simulation result when the ratio α was approximately 17.9 and approximately 20.6, the discharge time becomes longer as the ratio of the longer diameter a (shorter diameter b) to the height t decreases in a range in which the ratio of the longer diameter a (shorter diameter b) to the height t is less than 0.6. In the simulation result when the ratio α was approximately 17.9 and approximately 20.6, the discharge time in a range in which the ratio of the longer diameter a (shorter diameter b) to the height t is 0.6 or greater and 2.6 or less is shorter than the discharge time in a range in which the ratio of the longer diameter a (shorter diameter b) to the height t is less than 0.6 or greater than 2.6.

The present embodiment further obtains the following advantages.

(1) The ratio a/b of the longer diameter a to the shorter diameter b of the pellet 1 is greater than or equal to 1.0 and less than or equal to 2.6, and the ratio α of the unit height volume of the cylindrical portion 11B of the hopper 11 to the volume of a single (grain of) pellet 1 is greater than 16. This structure limits decreases in the flowability of the pellets 1 flowing out of the hopper 11 to the cylinder 12. This stabilizes the moldability of the sheath 22 of the electric wire 20.

In particular, in the pellet 1, there is no need to set the ratio a/b to 1.0 as long as the ratio a/b is in a predetermined range of 1.0 or greater and 2.6 or less. This widens an allowable range of the ratio a/b and increases an yield rate of the pellet 1. This increases the production efficiency of the pellets 1.

(2) The pellet 1 satisfies the relationship of $0.6 \le \sqrt{ab}/t \le 2.5$ in equation (1). This structure further limits decreases in the flowability of the pellets 1 flowing out of the hopper 11 to the cylinder 12.

(3) The ratio a/b of the pellet 1 is greater than 1.0 and less than or equal to 1.8. This structure further limits decreases in the flowability of the pellets 1 flowing out of the hopper 11 to the cylinder 12.

(4) The ratio a/b of the pellet 1 is greater than 1.3 and less than or equal to 1.7. This structure even further limits decreases in the flowability of the pellets 1 flowing out of the hopper 11 to the cylinder 12.

(5) The ratio a/b of the pellet 1 is greater than 1.4 and lower than or equal to 1.6. This structure even further limits decreases in the flowability of the pellets 1 flowing out of the hopper 11 to the cylinder 12.

(6) The cross-sectional shape of the pellet 1 is elliptic. This structure does not have a straight portion in a rim as viewed from the height direction of the pellet 1, thereby further limiting decreases in the flowability of the pellets 1 flowing out of the hopper 11 to the cylinder 12.

(7) The fluororesin is used as the material for the pellet 1. When the fluororesin is used for the pellet 1, static electricity is more likely to be generated than when another resin such as polyester resin is used for the pellet 1. As described above, the pellet 1 of the present embodiment limits decreases in the flowability of the pellets 1 flowing out of the hopper 11 to the cylinder 12. This reduces the effect of static electricity even when a fluororesin is used for the pellet 1.

(8) The pellet 1 is used to mold the sheath 22 of the electric wire 20. This limits decreases in the flowability of the pellets 1 flowing out of the hopper 11 to the cylinder 12 and reduces differences in the thickness of the sheath 22.

MODIFIED EXAMPLES

The description related with the above embodiment exemplifies, without any intention to limit, an applicable form of a thermoplastic resin pellet and a method for manufacturing an electric cable according to the present disclosure. In addition to the embodiment described above, the thermoplastic resin pellet and the method for manufacturing an electric cable according to the present disclosure is applicable to, for example, modified examples of the above embodiment that are described below and combinations of at least two of the modified examples that do not contradict each other.

In the above embodiment, the cross-sectional shape of the pellet 1 does not have to be a circle or an ellipse, and may be, for example, a cross-sectional shape described in (A) or (B).

Figure 12A:
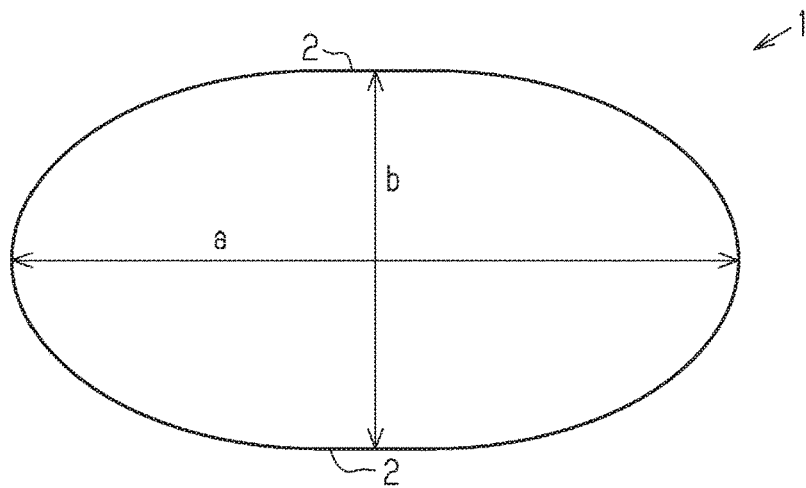
FIGS. 12A, 12B, and 12C are cross-sectional views of thermoplastic resin pellets of modified examples taken along planes orthogonal to a height direction.
Figure 12B:
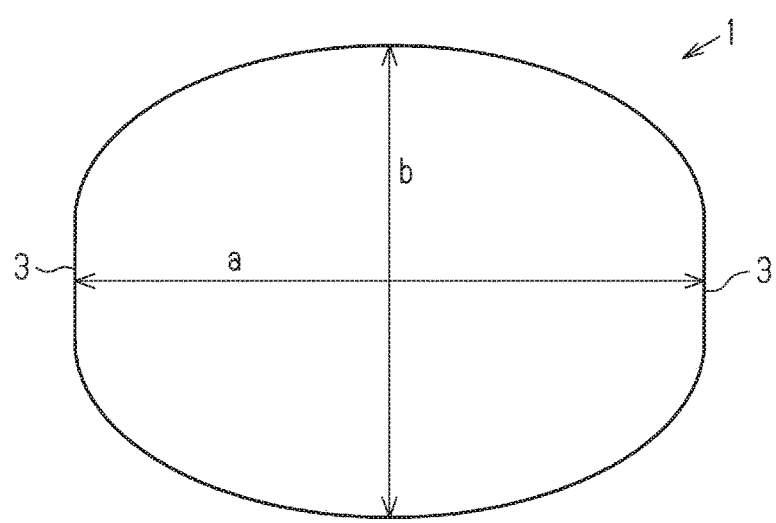
Figure 12C:
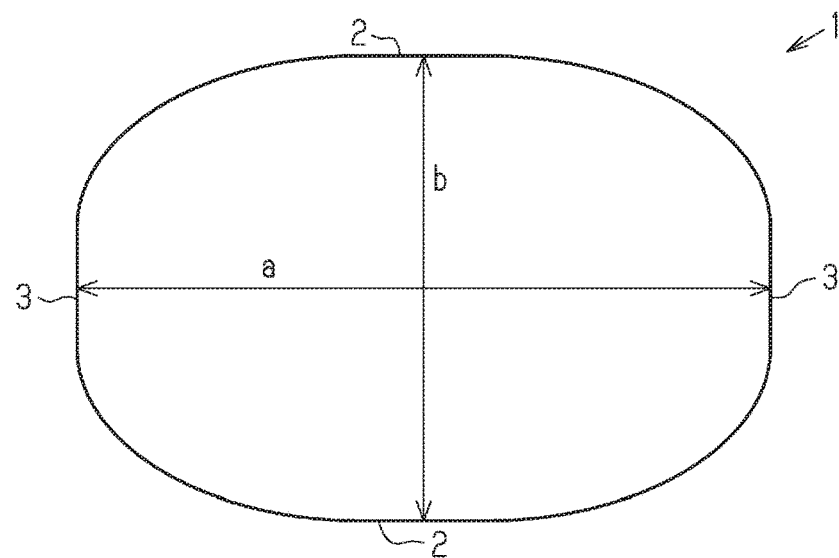

(A) As shown in FIGS. 12A to 12C, the pellet 1 may have a cross-sectional shape including a straight portion in part of an elliptic shape. More specifically, as shown in FIG. 12A, the pellet 1 may have a cross-sectional shape including a pair of straight portions 2 in a direction of a major axis of the ellipse. Further, as shown in FIG. 12B, the pellet 1 may have a cross-sectional shape including a pair of straight portions 3 in a direction of a minor axis of the ellipse. Moreover, as shown in FIG. 12C, the pellet 1 may have a cross-sectional shape including the two straight portions 2 in the direction of the major axis of the ellipse and the two straight portions 3 in the direction of the minor axis of the ellipse.

Figure 13A:
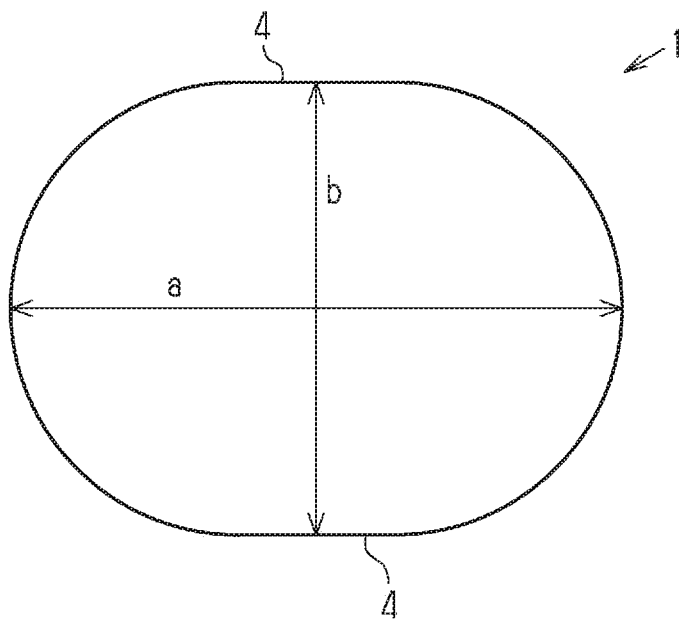
FIGS. 13A and 13B are cross-sectional views of thermoplastic resin pellets of other modified examples taken along planes orthogonal to a height direction.
Figure 13B:
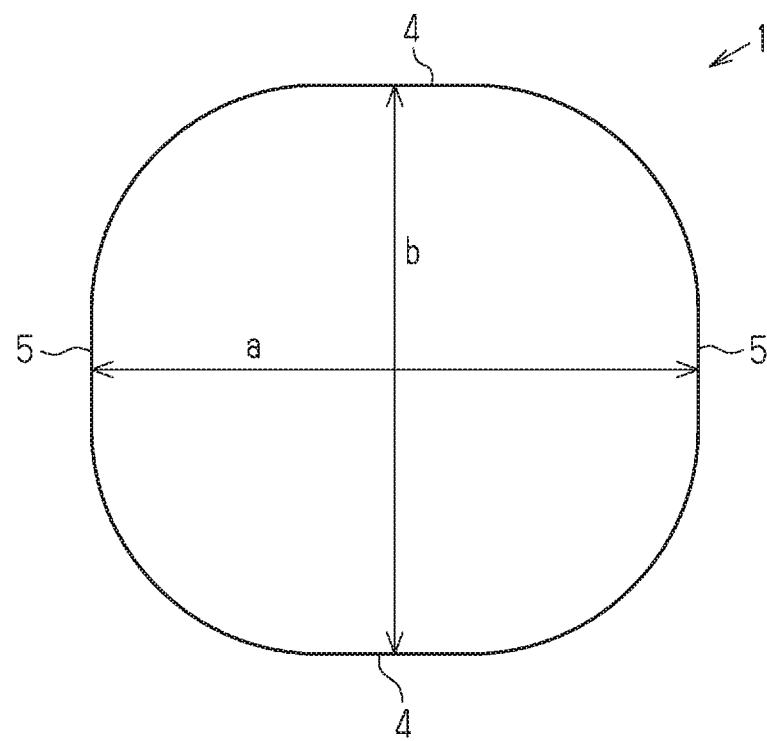

(B) As shown in FIGS. 13A and 13B, the cross-sectional shape of the pellet 1 includes a straight portion in part of a circular shape. More specifically, as shown in FIG. 13A, the circular shape may include a pair of straight portions 4. Further, as shown in FIG. 13B, the circular shape may include a pair of straight portions 5 at locations separated from the two straight portions 4 in addition to the two straight portions 4. There may be any number of pairs of straight portions. In one example, the cross-sectional shape of the pellet 1 may include more than three pairs of straight portions.

In the above embodiment, the rim of the cross-sectional shape of the pellet 1 may partially be recessed or include a slit.

It should be understood that the above-described invention may be embodied in many other specific forms within the scope and equivalence of the appended claims.

What is claimed is:

1. A method for manufacturing an electric cable using a molding machine,
the electric cable including a core wire and a sheath surrounding the core wire, and
the molding machine including a cylinder, a screw accommodated in the cylinder, a die coupled to a distal end of the cylinder, and a hopper that supplies a thermoplastic resin pellet into the cylinder, the thermoplastic resin pellet being columnar, the thermoplastic resin pellet having a cross-sectional shape taken along a plane orthogonal to a height direction of the thermoplastic resin pellet that has
a longer diameter represented by "a",
a shorter diameter represented by "b", and
a ratio a/b
greater than or equal to 1.0, and
less than or equal to 2.6; and
a ratio α of a unit height volume of a cylindrical portion of a hopper of a molding machine, into which the thermoplastic resin pellet is loaded, to a volume of the thermoplastic resin pellet that is greater than 16,
an inner diameter of the cylindrical portion of the hopper being less than an outer diameter of the screw,
the method comprising:
supplying the thermoplastic resin pellet to the hopper;
melting the thermoplastic resin pellet in the cylinder to supply molten resin to the die; and
extruding the molten resin from the die to form the sheath on the core wire.

2. The method according to claim 1, wherein
a height of the thermoplastic resin pellet is "t", and the thermoplastic resin pellet further satisfies equation (1)
$0.6 \leq \sqrt{ab}/t \leq 2.5$ 3. The method according to claim 1, wherein the ratio a/b is greater than 1.0, and the ratio a/b is less than or equal to 1.8.

4. The method according to claim 3, wherein the ratio a/b is greater than or equal to 1.3, and the ratio a/b is less than or equal to 1.7.

5. The method according to claim 4, wherein the ratio a/b is greater than or equal to 1.4, and the ratio a/b is less than or equal to 1.6.

6. The method according to claim 1, wherein the cross-sectional shape is elliptic.

7. The method according to claim 1, wherein the thermoplastic resin pellet includes a fluororesin.

8. The method according to claim 2, wherein the ratio a/b is greater than 1.0, and the ratio a/b is less than or equal to 1.8.

9. The method according to claim 2, wherein the cross-sectional shape is elliptic.

10. The method according to claim 2, wherein the thermoplastic resin pellet includes a fluororesin.

11. The method according to claim 3, wherein the cross-sectional shape is elliptic.

12. The method according to claim 3, wherein the thermoplastic resin pellet includes a fluororesin.

13. The method according to claim 6, wherein the thermoplastic resin pellet includes a fluororesin.

* * * * *